United States Patent
Beier et al.

(10) Patent No.: US 10,884,704 B2
(45) Date of Patent: Jan. 5, 2021

(54) SORTING A TABLE IN ANALYTICAL DATABASES

(71) Applicant: INTERNATIONAL BUSINESS MACHINES CORPORATION, Armonk, NY (US)

(72) Inventors: Felix Beier, Holzgerlingen (DE); Andreas Brodt, Gerlingen (DE); Oliver Schiller, Dettingen (DE); Knut Stolze, Hummelshain (DE)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 15/710,902

(22) Filed: Sep. 21, 2017

(65) Prior Publication Data

US 2019/0087156 A1    Mar. 21, 2019

(51) Int. Cl.
*G06F 7/24* (2006.01)

(52) U.S. Cl.
CPC ..................... *G06F 7/24* (2013.01)

(58) Field of Classification Search
CPC ....... G06F 16/22; G06F 16/285; G06F 16/278
See application file for complete search history.

(56) References Cited

U.S. PATENT DOCUMENTS

| | | | |
|---|---|---|---|
| 6,714,938 B1 * | 3/2004 | Avadhanam | G06F 16/2462 |
| 6,990,742 B1 * | 1/2006 | Schmidt | G06F 17/30 707/2 |
| 8,478,775 B2 | 7/2013 | Netz et al. | |
| 8,549,004 B2 * | 10/2013 | Lakshminarayan | G06F 16/2462 707/737 |
| 8,996,544 B2 | 3/2015 | Ziauddin et al. | |
| 9,372,889 B1 | 6/2016 | Jakobsson et al. | |
| 2015/0032763 A1 | 1/2015 | Marwah et al. | |
| 2015/0088812 A1 | 3/2015 | Ziauddin et al. | |
| 2015/0199407 A1 | 7/2015 | Ziauddin et al. | |
| 2015/0242452 A1 | 8/2015 | Dickie et al. | |

(Continued)

OTHER PUBLICATIONS

Gu et al. ('Exploring Data Parallelism and Locality in Wide Area Networks', Published in: 2008 Workshop on Many-Task Computing on Grids and Supercomputers; Date of Conference: Nov. 17-17, 2008; Date added to IEEE Xplore: Feb. 6, 2009; Printed ISBN: 978-1-4244-2872-4). (Year: 2008).*

(Continued)

*Primary Examiner* — Ken Hoang
(74) *Attorney, Agent, or Firm* — Michael A. Petrocelli

(57) ABSTRACT

A computer-implemented method, a system, and a computer program product for sorting a data table by an attribute of the data table is provided. Each data block of the data table is provided with attribute value information being indicative of distinct values and/or ranges of values of the attribute in each of the data blocks of the data table. Distinct ranges and/or distinct values of the attribute of the data table are derived from the attribute value information. For each determined distinct range and/or distinct value, a bucket may be created. For each created bucket, it may be determined, using the attribute value information, which data block of the data table is to be scanned. Each scanned record is distributed to a corresponding bucket. The entries or records in each bucket having more than one record, may be sorted by the attribute.

16 Claims, 4 Drawing Sheets

(56) References Cited

U.S. PATENT DOCUMENTS

| | | | |
|---|---|---|---|
| 2015/0242506 A1 | 8/2015 | Dickie et al. | |
| 2015/0286681 A1 | 10/2015 | Baer et al. | |
| 2015/0286682 A1 | 10/2015 | Ziauddin | |
| 2015/0363447 A1 | 12/2015 | Dickie | |
| 2016/0041907 A1* | 2/2016 | Jung | G06F 12/10 711/122 |
| 2016/0098451 A1 | 4/2016 | Dickie | |

OTHER PUBLICATIONS

Bloom, "Space/Time Trade-offs in Flash Coding with Allowable Errors", Communications of the ACM, vol. 13, No. 7, Jul. 1970, pp. 422-426.

Wikipedia, the free encyclopedia, "Bucket sort", printed on Jan. 13, 2017, pp. 1-4, https://en.wikipedia.org/wiki/Bucket_sort.

Wikipedia, the free encyclopedia, "Countingsort", printed on Jan. 13, 2017, pp. 1-5, https://de.wikipedia.org/wiki/Countingsort.

IBM, "DB2 with BLU Acceleration: A rapid adoption guide", developerWorks, May 7, 2015, 11 pages.

Oracle®, "Using Zone Maps", Database Data Warehousing Guide, Chapter 13, Online Documentation 12c Release 1 (12.1), printed Feb. 3, 2016, pp. 1-25.

Wikipedia, the free encyclopedia, "Radix sort", printed on Jan. 13, 2017, pp. 1-11, https://en.wikipedia.org/wiki/Radix_sort.

Ślęzak et al., Brighthouse: An Analytic Data Warehouse for Adhoc Queries, PVLDB '08, Aug. 23-28, 2008, pp. 1337-1345.

Beier et al., Pending U.S. Appl. No. 15/161,396, filed May 23, 2016, entitled: "Extreme Value Computation", pp. 1-41.

Beier et al., Pending U.S. Appl. No. 15/335,082, filed Oct. 26, 2016, entitled: "Self-Optimizing Value Range Synopsis in Analytical Databases", pp. 1-36.

Bonomi et al., "An Improved Construction for Counting Bloom Filters", ESA 2006, LNCS 4168, pp. 684-695, 2006.

Oracle®, "Partition Pruning with Zone Maps", Database VLDB and Partitioning Guide, Online Documentation 12c Release 1 (12.1), printed on Feb. 10, 2016, pp. 1-3.

Oracle®, "Oracle Database 12c Attribute Clusters and Zone Maps", printed on Feb. 10, 2016, pp. 1-7.

Lersch, "Filtering and Indexing in a Partially-sorted Log Archive", 2015, pp. 1-12, http://wwwlgis.informatik.uni-kl.de/cms/fileadmin/publications/2015/Lersch_GuidedResearch_V4.pdf.

Bach et al., Abstract for "Offloading / Smart Scan", SpringerLink, Chapter: Expert Oracle Exadata, pp. 21-66, printed on May 7, 2016.

* cited by examiner

SORTING A TABLE IN ANALYTICAL
DATABASES

BACKGROUND

The present invention relates to the field of digital computer systems, and more specifically, to a method for sorting a data table.

Analytical database systems manage very large amounts of data and are optimized for queries that read large portions of it. At the same time, they offer the complete querying power of SQL.

A fundamental operation for analytical workloads is to sort a large number of rows or records. In order to analyze large amounts of data a typical task is to rank certain categories (e.g., product groups) according to some ordering criteria. Ordering is important for presenting a query result in a consumable way. Also, many internal operations require sort operations as fundamental building blocks for more complex tasks. Thus, it is crucial that such a system is able to sort large amounts of rows as fast as possible.

Sorting a large amount of rows is an expensive operation both in terms of CPU and memory requirements. The run time complexity of a general sort algorithm lies in O(n log n) where n is the number of rows to sort. A system that is capable of greater speed and is faster than the current art is needed.

SUMMARY

A system that is capable of greater speed and is faster than the current art would also have a competitive advantage compared to known systems.

Various embodiments provide a method for sorting a data table, computer system and computer program product as described by the subject matter of the independent claims. Advantageous embodiments are described in the dependent claims. Embodiments of the present invention can be freely combined with each other if they are not mutually exclusive.

In one aspect, the invention relates to a method for sorting a data table by an attribute of the data table, attribute value information being provided for data blocks of the data table, the attribute value information being indicative of distinct values and/or ranges of values of the attribute in each of the data blocks of the data table. The method comprises:

deriving from the attribute value information distinct ranges and/or distinct values of the attribute of the data table, and for each determined distinct range and/or distinct value creating a bucket;

for each created bucket determining using the attribute value information which data block of the data table is to be scanned;

scanning records of the determined data blocks and distributing each scanned record to the corresponding bucket;

sorting by the attribute the entries or the records in each bucket having more than one record;

processing the buckets in the sort order to produce the sorted data table or providing the buckets in the sort order as the sorted data table.

In another aspect, the invention relates to a computer program product comprising a computer-readable storage medium having computer-readable program code embodied therewith, the computer-readable program code configured to implement all of features of the method according to preceding embodiments.

In another aspect, the invention relates to a computer system for sorting a data table by an attribute of the data table, attribute value information being provided for data blocks of the data table, the attribute value information being indicative of distinct values and/or ranges of values of the attribute in each of the data blocks of the data table; the computer system comprising: a computer processor, a computer-readable storage medium, and program instructions stored on the computer-readable storage medium being executable by the processor, to cause the computer system to perform a method, comprising:

deriving from the attribute value information distinct ranges and/or distinct values of the attribute of the data table, and for each determined distinct range and/or distinct value creating a bucket;

for each created bucket determining using the attribute value information which data block of the data table is to be scanned;

scanning records of the determined data blocks and distributing each scanned record to the corresponding bucket;

sorting by the attribute the entries or the records in each bucket having more than one record;

processing the buckets in the sort order to produce the sorted data table or providing the buckets in the sort order as the sorted data table.

In another aspect the invention relates to a computer program product for sorting a data table by an attribute of the data table, attribute value information being provided for data blocks of the data table, the attribute value information being indicative of distinct values and/or ranges of values of the attribute in each of the data blocks of the data table. The computer program product comprises a computer readable storage medium having program instructions embodied therewith, wherein the computer readable storage medium is not a transitory signal per se. The program instructions are executable by a computer to cause the computer to perform a method, comprising: deriving from the attribute value information distinct ranges and/or distinct values of the attribute of the data table, and for each determined distinct range and/or distinct value creating a bucket; for each created bucket determining using the attribute value information which data block of the data table is to be scanned; scanning records of the determined data blocks and distributing each scanned record to a corresponding bucket of the buckets created for each of the determined distinct range and/or distinct values; sorting by the attribute the entries in each of the buckets having more than one record; and providing the buckets in the sort order as the sorted data table.

BRIEF DESCRIPTION OF THE SEVERAL
VIEWS OF THE DRAWINGS

In the following embodiments of the invention are explained in greater detail, by way of example only, making reference to the drawings in which.

DETAILED DESCRIPTION

Figures 1A, 1B:
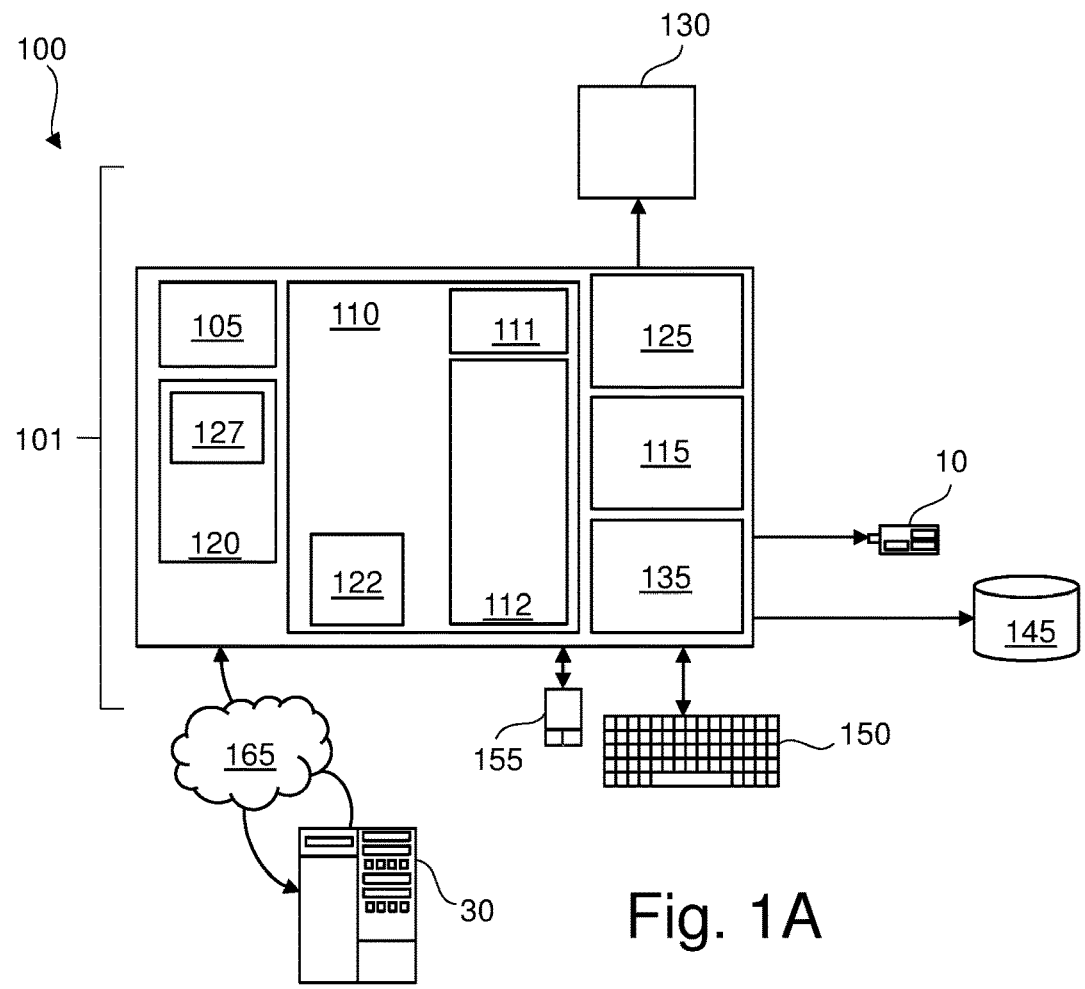
FIG. 1A represents a computerized system, suited for implementing one or more method steps as involved in the present disclosure.
FIG. 1B is a diagram of a data table with example data.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The attribute value information may be descriptive of the attribute. Using the attribute value information a preselection of data blocks of the data table may be performed before scanning the preselected data blocks. The attribute value information may comprise information or metadata on the attribute that allows such a preselection. For example, the maximum and the minimum attribute values of the attribute define a first range of values of the attribute in a respective data block. For example, a received data query may require a second range of values of the attribute. The processing of the data query may comprise selecting data blocks of the data table whose respective first range overlap with the second range and processing those selected data blocks (that forms a scan list). In another example of the attribute value information comprising or indicating all the distinct values of a data block, a received query requiring a range of values or certain values may be processed by selecting data blocks whose distinct values fulfill the query condition using the attribute value information.

The term "bucket" refers to a data container/unit that is used to store records or entries. The bucket may further store keys. The keys may be used for access to the data of the bucket. A bucket may consist of a block of memory that is subdivided into a predetermined number of smaller blocks of uniform size, each of which is an allocable unit of memory. For example, a bucket may comprise a data structure which is, e.g., part of a hash table. A bucket may be created for containing a single distinct value and thus it is referred to as single value bucket or may be created for containing attribute values of a given range and thus it is referred to as a value range bucket.

The present method may be advantageous as the required buckets (or sort buckets) are known in advance based on the attribute value information; and thus there may not be unused buckets or may be a limited number of unused buckets. Such unused buckets is a typical problem with distribution sort algorithms.

If each bucket corresponds to a distinct value, it is sufficient just to distribute the records (rows) to the buckets (no bucket-internal sorting). The computational effort is O(n). Even if bucket-internal sorting is needed, the number of records in each bucket to be sorted remains smaller than the full set of records and thus the advantage of reducing the computational effort may be there.

The present method may further have the advantage of accelerating sort operations in analytical databases by exploiting information on the distinct values and value ranges contained in the particular data blocks as provided from attribute value information on the column or the attribute to sort by. Examples consistent with embodiments of the present disclosure may include:

1. Compute a scan list using the attribute value information for a received query. This results in a list of data blocks of the data table that contain relevant data for the received query. Only these data blocks are further considered for the received query.

2. Compute a set of value range buckets from the attribute value information.

3. Distribute values or records or rows into their respective buckets instead of fully sorting them. Since the required buckets are known a-priori unused buckets, a typical problem of distribution sort algorithms, are unlikely. The data may be processed within a bucket further in order to sort the records of the bucket if the bucket comprises more than one record having more than one value of the attribute. In other terms, this is referred to as a bucket-internal sorting.

4. Empty the buckets in sort order to produce a sorted sequence. The emptying comprises moving the records from the buckets to a storage area e.g. the storage area where the data table is stored.

If the number of distinct values is sufficiently small (e.g. smaller than a predefined threshold number), the distinct values occurring in a particular data block may be listed in the corresponding attribute value information e.g. in addition to the extremum values of the attribute in the data block. Otherwise, if the number of distinct values is higher than the predefined threshold number, a bloom filter technique may be used to indicate the distinct values of the attribute as described below.

For example, the attribute value information on the attribute (or sort attribute) of a given data block may comprise the full list of distinct values ("in-list") occurring in the respective data block. Combining the value lists of all attribute values information in the scan list results in the complete set of distinct values that have to be sorted. For these distinct values, respective single value buckets may be created. A bucket may be already allocated or created in the query plan allocating a bucket for each distinct value. To perform the actual sort it may be sufficient to distribute the values into their respective buckets rather than sorting them by comparison. This way the sort can be achieved in O(n) time. The distribution step may for example be implemented using a hash-based GROUP BY operator. Moreover, as both the number of groups/buckets and the set of grouping keys is known a-priori, it a hash function may be used for these values or at least one with little collisions. The hash function may enable a systematic distribution of the records to the respective buckets. In addition to that, the memory requirements for the hash table can be estimated which may be valuable information for workload management. Thus, when the records are scanned at query runtime, they are still distributed into their respective buckets.

In another example, value range buckets may require a second processing step before the final sorted result can be produced. The data within each value range bucket may yet be sorted using a data sorting technique. Only then the buckets can be processed (e.g. emptied) in sort order.

In another example, value-range buckets may be assigned only a single distinct value at query runtime, which may happen but cannot be predicted a-priori. Thus, as an optimization, the range buckets may track at runtime whether or not they contain only a single distinct value. The sorting in this example may be more efficient compared to prior art, since the super-linear fraction of the effort (or sorting) is limited to rows in a value-range bucket and not to all rows in the data table.

According to one embodiment, each indicated distinct value of the attribute value information is encoded into one or more bits of a bit vector of a bloom filter, wherein the attribute value information of each data block of the data table comprises the bit vector as an indication of the distinct values of the data block. This embodiment may particularly be advantageous in case of a high number of distinct values per data block. Using the distinct values for describing a data lock may speed up the sorting process compared to the case where the values ranges are used. This is because, the selection efficiency of the data blocks using the distinct values is higher and thus avoiding unnecessary scanning of selected data blocks that may not contain desired records of a bucket.

The bloom filter can be employed to approximate or indicate the set of distinct values stored in a data block in case the number of distinct values is too large for listing them completely, but not large enough to overflow a small bloom filter of, e.g., 32 or 64 bits.

The bloom filter may store a fixed amount of bits, which are either set to 1 or 0, thereby encoding a set of values. The 1-bits have originally been calculated using a hash function over the values that are stored in the data blocks (each value sets a specific bit). A 1-bit might have been set by multiple values that are inside the data block. This may be calculated by determining a list of all values that might have set all 1-bits in the bloom filter (candidates).

However, a bucket might be empty if there is no actual value in the data block but the same bit has been set by another one of the same data block.

According to one embodiment, the attribute value information further comprises the extremum values (min, max) of the attribute in each data block of the data table, the deriving of the distinct values comprising:
iterating over all 1-bits in the bloom filter, and for every 1-bit position h executing the following steps: determining kmin and kmax as follows:

$$k\min = \frac{\min * a - h}{b} \text{ and } k\max = \frac{\max * a - h}{b},$$

where b is the number of bits in the bloom filter and a is a predefined value; and for every value k in the range [kmin; kmax] compute a candidate distinct value $x_k$ $$x_k = \frac{k * b + h}{a}$$

that can set the bit h.

For example, the values k are of integer type.

This embodiment may be advantageous in particular for larger sets of distinct values that can be represented using a Bloom filter. In this case, the full value list of the distinct values may not be available. However, a set of candidate values may be computed. Bloom filters map each value to a particular bit position in a bit vector using a hash function. At this collisions may occur, i.e., several values may be mapped to the same bit position. Because of this, it may not be clear which value caused a particular bit to be set, but a set of candidate values can be computed that could have caused the bit to be set. Thus, for every 1-bit in the Bloom filter the set of values has to be computed that is mapped to the respective bit position. Naturally, the candidate values are limited to the min/max range given by the extremum values of the attribute value information.

For example, a brute-force approach to determine the candidate set may be used to test every value in the min/max range of a given data block against the bloom filter of the given data block. If it maps to a 1-bit, the value is a candidate. Another approach is possible if the Bloom filter uses a multiplicative hash function in form of h(x)=a*x mod b. where a is a positive numeric constant and b is the number of bits in the Bloom filter. Thus, the bit positions are in range 0, . . . , b−1. Then, the set of candidate values is $$\left\{ x_k \mid x_k = \frac{k * b + h}{a} \right\}$$

where h is the bit position of a 1-bit in the Bloom filter and the (otherwise infinite) set of values for the positive integer k is limited by the min/max values to the range $$\frac{\min * a - h}{b} \leq k \leq \frac{\max * a - h}{b}$$

Thus, the candidate values can be calculated as follows:
1. Iterate over all 1-bits in the bloom filter. For every 1-bit position h execute the following steps.
2. Determine the smallest and largest value for k $$k_{min} = \frac{\min * a - h}{b} \text{ and } k_{max} = \frac{\max * a - h}{b}$$

3. For every value for k∈[kmin, kmax] compute a candidate value xk.

Note that other hash functions might also have the property of being reversible to a set of candidate values in similar ways. This may enable another approach for determining the candidates values. The other approach consists on inverting the hash function (e.g. a multiplicative hash function) that has been used for generating the bloom filter. By using min and max, kmin and kmax can be computed (e.g. solving the reversed hash function for min and max yields kmin, kmax). Those extremum-ks are the (integer) bounds for possible factors that could have caused the currently examined bit to be set. For each k in this interval, the respective candidate value can then be calculated.

Once a set of candidate values has been determined, a bucket is created for every candidate value and the data can be distributed into the buckets just like for full value lists.

According to one embodiment, the sorting of the buckets is performed in parallel. The intra-bucket sort described above can very easily be parallelized across several CPU cores or even compute nodes. All buckets have the property of being disjoint. Thus, every bucket can be sorted independently in parallel. The system may create an execution plan that schedules the intra-bucket sorts in parallel on different hardware (CPU cores or compute nodes).

According to one embodiment, the buckets are stored in a first storage. The processing of a given bucket of the buckets comprises storing records of the given bucket in a second storage and emptying the given bucket. For example, the records of the given bucket may be stored in a storage area where the unsorted data table is initially stored. The buckets may be stored in a main memory. This may speed up the sorting process.

According to one embodiment, the processing further comprises: upon scanning the determined data blocks of a given bucket, processing the given bucket. This may further speed up the sorting process.

According to one embodiment, before creating the buckets sorting the data blocks of the data table by an extremum value of the attribute. For example, the data blocks may be sorted in accordance with the order of their respective attribute minimum value.

According to one embodiment, the derived distinct values comprise the distinct values of the attribute value information. This may particularly be advantageous in case of small amount of distinct values per data blocks. This may further speed up the sorting process as the selection of the data blocks to be scanned is more accurately performed compared to the case where a data block is defined by a range of values instead of distinct values.

According to one embodiment, the distinct ranges comprise non-overlapping ranges of the attribute value information further comprising the minimum and maximum values of the attribute, wherein the attribute is an enumerable type.

FIG. 1A represents a general computerized system, suited for implementing method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1A, the computer 101 includes a processor 105, memory (main memory)110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1A, software in the memory 110 includes instructions or software 112 e.g. instructions to manage databases such as a database management system.

The software in memory 110 shall also typically include a suitable operating system (OS) 111. The OS 111 essentially controls the execution of other computer programs, such as possibly software 112 for implementing methods as described herein.

The methods described herein may be in the form of a source program or software 112, executable program or software 112 (object code), script, or any other entity comprising a set of instructions to be performed. When a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1A, the methods can be stored on any computer readable medium, such as storage 120, for use by or in connection with any computer related system or method. The storage 120 may comprise a disk storage such as HDD storage.

The storage 120 may comprise at least one data table (or data set) 127 (FIG. 1B). For example, the software 112 may receive (automatically or upon request) as input the data table 127, or may download the data table 127 from storage 120 or memory 110.

The data table 127 may comprise one or more columns 131A-B, wherein each column is represented by a respective attribute (e.g. "ID" 131A and "Age" 131B). The rows of the data table 127 may each comprise values of the attributes 131A-B. The data table 127 may for example comprise or may be stored on multiple (e.g. contiguous) data blocks b1-bN.

The term "data block" as used herein may refer to a logical or physical storage for storing the data of the data table.

For example, as illustrated in FIG. 1B, the data table 127 may be divided or split or assigned to data blocks b1-bN using the number of rows in the data table 127.

In another example, the data table 127 may be split or divided based on storage size such that each data block b1-bN contains or is assigned to one or more storage units e.g. data pages. The term "storage unit" as used herein is intended to refer to the minimum addressable unit (e.g. by software 112) in order to store the data table 127. The size of a storage unit may be an integer multiple of the size of a disk unit. The size of the storage unit may be user defined. For example, each storage unit (e.g. data page) may correspond to a specific number of bytes of physical database space on disk (e.g., 4 KB). Other storage units having different granularities may be addressable or used in order to store data e.g. in the storage 120. For example, other storage levels may comprise containers and extents, wherein extents can be defined in term of number of data pages, while a container can determined in term of number of extents.

The rows of each data block e.g. b1 of the data table 127 may be stored on contiguous, linked, or indexed disk units (e.g. of storage 120) that form the corresponding data pages of the data block b1. The term disk unit refers to the minimum addressable unit on storage 120. For example, a disk unit may have a size of 512 bytes. The data blocks b1-bN may or may not comprise the same number of data pages.

The term "data table" or data set as used herein refers to a collection of data that may be presented in tabular form. Each column in the data table may represent a particular variable or attribute. Each row in the data table may represent a given member, record or entry of the data table.

Each data block b1-bN of the data table 127 may be associated with attribute value information of one or more attributes of the data table, e.g. attribute 131B. For exemplification purpose, in the following the attribute value information comprises information of the attribute 131B. For example, the attribute value information may be saved together with the data block to which it is associated (which is an indication that they both correspond to each other). In another example, the attribute value information may be stored (e.g. in a table) separately from the associated data block and having pointers/addresses or links to the associated data block.

The attribute value information is indicative or covering all values of a data block. The attribute value information of a data block may comprise all distinct values of the attribute 131B of the data block. In addition or alternatively, the attribute value information of a data block may comprise one or more ranges of values of the attribute 131B that are in the data block.

For data block b1, the attribute value information may for example comprise a list of distinct values of b1, namely 20, 50 and 90. In another example, the attribute value information may comprise a range indicative of the values of the attribute 131B of b1, such as range [20, 90].

In another example, a part of data block may be described using the list of distinct values and another part of the data block may be described using one or more ranges. For example, if a data block comprises values 1, 3, 5 and 6 to 20, the attribute value information of this data block may comprise a list of distinct values 1, 3 and 5 and a range [6, 20] as indicative of the values in the data block.

While FIG. 1B only shows a few attributes and data blocks, it will be appreciated that numerous attributes and/or data blocks may exist or may be used with the present method.

Figure 2:
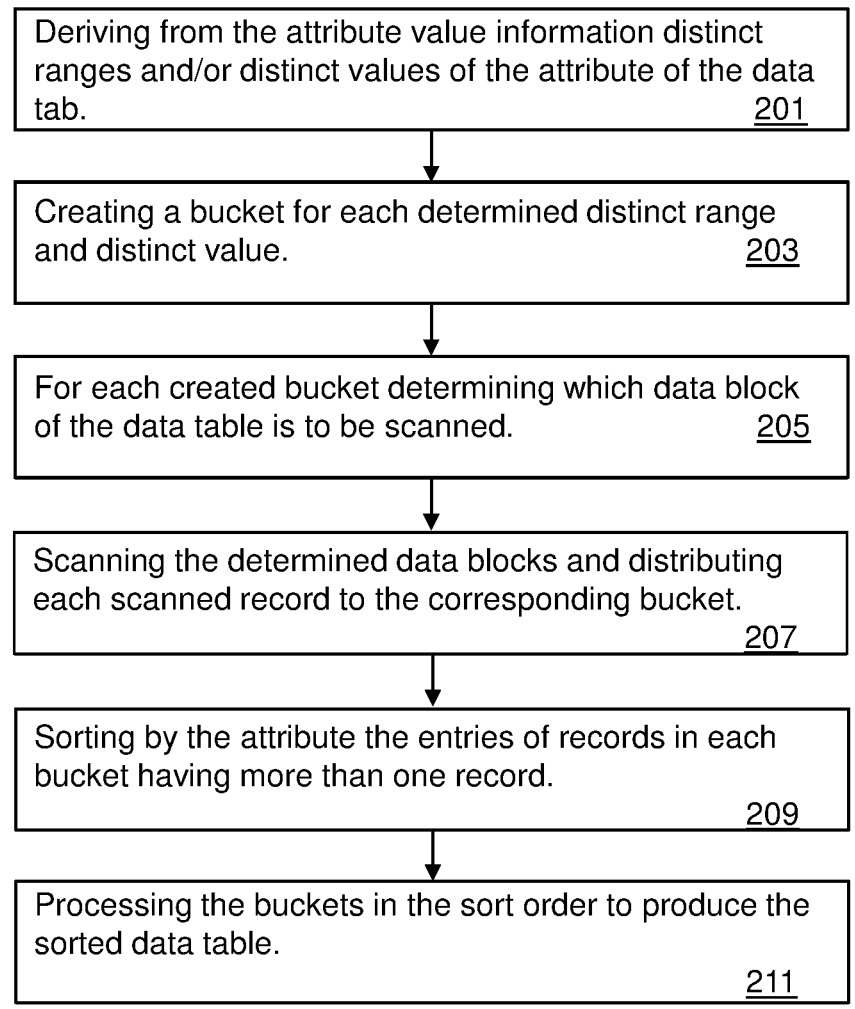
FIG. 2 is a flowchart of a method for sorting a data table.

FIG. 2 is a flowchart of a method for sorting a data table e.g. 127 by an attribute e.g. 131B of the data table 127.

In step 201, distinct ranges and/or distinct values of the attribute e.g. 131B of the data table 127 may be derived from the attribute value information of data blocks of the data table 127.

Assuming for exemplification purpose in the context of FIG. 2 that data table 127 has only data blocks b1-b4. In this simplified example of FIG. 2, it is assumed that the attribute value information of data block b1 comprises the distinct values of 20, 50 and 90. The attribute value information of the attribute 131B in data block b2 indicates the range [20, 50] while the attribute value information of the attribute 131B in the data block b3 indicates the range [10, 80]. The attribute value information of data block b4 comprises the distinct values of 50, 80 and 90.

Step 201 may result in these distinct values 20, 50, 80 and 90 as being derived from the attribute value information of the whole data table 127. The values 50 and 90 are present in attribute values information of both b1 and b4. Thus only one value 50 and one value 90 is derived.

Furthermore, the range of b2 is completely overlapping with the bigger range of b3 and thus only the distinct range [10, 80] can be derived. However, the values 20, 50, 80 and 90 which are part of the attribute value information of b1 and b4 have to be considered for deriving non-overlapping or distinct ranges. Thus, the resulting or derived distinct or non-overlapping ranges are (10, 20), (20, 50) and (50, 80). In this example, there are thus three distinct ranges (10, 20), (20, 50) and (50, 80) and four distinct values 20, 50, 80 and 90.

For each determined distinct range and/or distinct value a bucket is created in step 203. Following the above example, seven bucket may be created for the respective distinct ranges (10, 20), (20, 50) and (50, 80) and distinct values 20, 50, 80 and 90. Thus a bucket of distinct value 20 may be configured to comprise entries having attribute value of the attribute 131B equal to 20. A bucket of distinct range (10, 20) may be configured to comprise entries having attribute value of the attribute 131B in the range (10, 20). In other terms, step 203 results in single value buckets and/or value-range buckets.

For example, a query optimizer of the computer system 100 may be configured so as to use the attribute value information to provide a query execution plan, wherein the buckets are created at the query plan time.

For each created bucket it is determined in step 205 using the attribute value information which data block of the data table 127 is to be scanned. For example, b1 is determined (to be scanned) for all the buckets except the bucket of range (10, 20), because b1 has a range of values of the attribute 131B between 20 and 90. For example, for bucket of range (50, 80), data blocks b1, b3 and b4 may be determined in order to be scanned. b2 has only one value 50 which may be interesting for the bucket (50, 80); however, the range of the bucket excludes that value and thus b2 is not determined (to be scanned) for this bucket.

In step 207, the determined data blocks (or records of the determined data blocks) are scanned and each scanned record is distributed to the corresponding bucket. For example, while scanning data blocks b1, b3 and b4 the bucket of range (50, 80) is filed with entries having attribute values within the range (50, 80). If for example a data block is determined to be scanned for more than one bucket (e.g. b1 is determined to be scanned for 6 buckets), then while scanning b1 the entries may be distributed over the 6 buckets based on the values of the attribute 131B. In other terms, if a data block is determined to be scanned for two buckets there is no need to scan the data block twice i.e. while scanning the data block once the two buckets may be filed. The buckets may be stored in the main memory 110.

In step 209, the entries in each bucket having more than one record (and having different values of the attribute 131B) may be sorted. For example, buckets of range (50, 80) may comprise more than one record or entry and thus may be sorted (internally).

In one example, the sorted buckets may be provided as the sorted data table. The sorted buckets can be consumed or used as the sorted data table. For example, the buckets may directly be provided to the consumer so that it can read them ordered without intermediate copy. Once the buckets are use or consumed the buckets may be deleted or emptied from the storage where they are stored. For example, the consumer or the user may provide a predefined time period during which the buckets may be required. After the predefined period is expired the buckets may be deleted to free up the storage.

In another example, the sorted buckets are processed in step 211 in the sort order to produce the sorted data table. Following the above example, the buckets are processed in the following order: buckets of (10, 20), 20, (20, 50), 50, (50, 80), 80 and 90 in accordance with the values of the attribute 131B. The processing of a bucket comprises emptying the bucket by moving its records from where the bucket is stored to a storage area (e.g. storage area where the data table 127 is stored) and thereby deleting the bucket. The buckets may be stored in the main memory 110.

For example, (see FIG. 4) while performing step 207 if a bucket being ordered first is completed in that all its corresponding data blocks have been scanned, steps 209 and 211 may be executed immediately on this bucket (e.g. even though step 207 is still executing for filing other buckets). In this example, it may be advantageous to sort the data blocks of the data table based on their value ranges in order to speed up the execution of steps 207-211 as described in this example.

Figure 3:
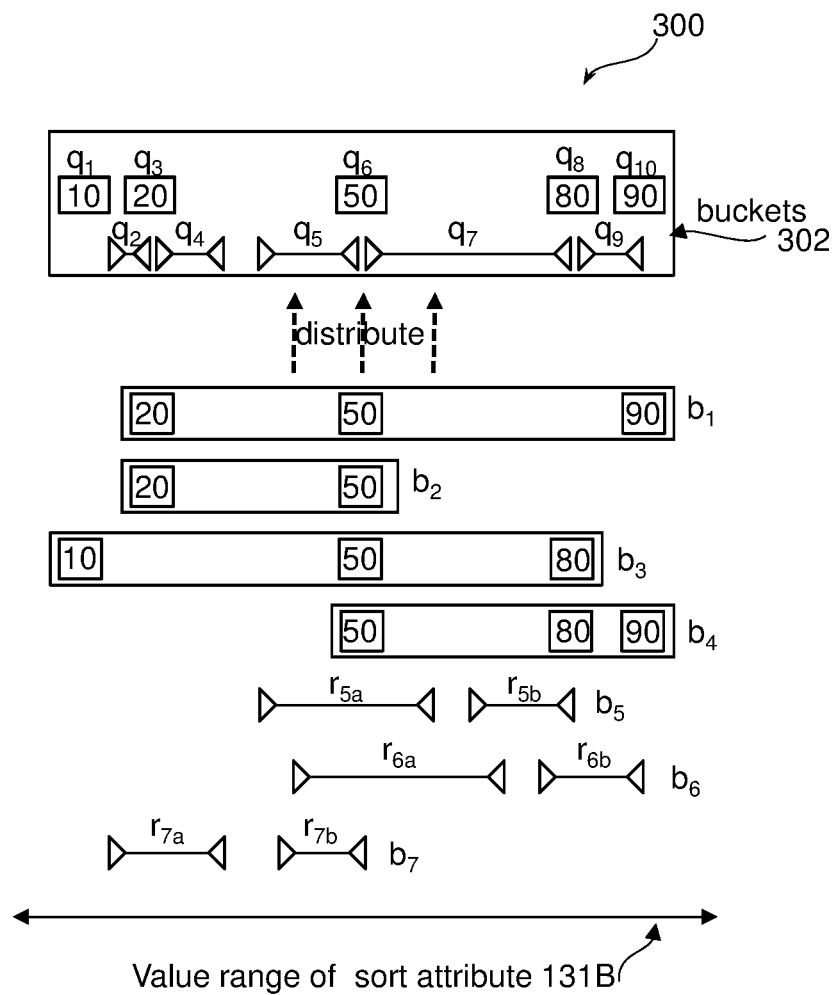
FIG. 3 is a diagram illustrating an example method for creating buckets for sorting the data table.

FIG. 3 is a diagram 300 illustrating an example method for creating buckets 302 for sorting the data table 127 by the attribute 131B. In this example, of FIG. 3, the data table 127 has or comprises seven data blocks b1-b7. The data blocks of the table 127 contain full value lists and value ranges as illustrated in diagram 300.

As illustrated in FIG. 3, the attribute value information of the data blocks b1-b4 comprises their respective distinct values. For example, the attribute value information of data block b1 comprises all the distinct values 20, 50 and 90 of the data block b1. The attribute value information of data block b2 comprises all the distinct values 20 and 50 of the data block b2. The attribute value information of data block b3 comprises all the distinct values 10, 50 and 80 of the data block b3. The attribute value information of data block b4 comprises all the distinct values 50, 80 and 90 of the data block b4.

The attribute value information of the each data block of data blocks b5-b7 comprises respective ranges of all values of the attribute 131B within the each data block. For example, as illustrated in FIG. 3, the attribute value information of the data block b5 comprises the values ranges $r_{5a}$ and $r_{5b}$. The attribute value information of the data block b6 comprises the values ranges $r_{6a}$ and $r_{6b}$. The attribute value information of the data block b7 comprises the values ranges $r_{7a}$ and $r_{7b}$. Each of the ranges $r_{5a}$-$r_{7b}$ indicates that the values of the respective data block are within that range.

Using the attribute value information as described above value-range buckets may be created for value ranges $r_{5a}$-$r_{7b}$ and single-value buckets may be created for values from value-lists (e.g. from Bloom filters) 10, 20, 50, 80 and 90. The total set of buckets may be computed or created in the following steps:

1. The set of single-value buckets is determined for each distinct value 10, 20, 50, 80 and 90.

2. Overlapping value ranges of the ranges $r_{5a}$-$r_{7b}$ are combined to a single range.

3. Value ranges [a; b] that include a value v for which a single-value bucket exists are split into two ranges [a; v) and (v; b].

In the example of FIG. 3, the single-value buckets are created exactly as for full value lists or Bloom filters. This results in buckets q1; q3; q6; q8; and q10 for the respective distinct values 10, 20, 50, 80 and 90. In addition, the value ranges from b5-b7 result in a number of additional value-range buckets. All value ranges $r_{5a}$-$r_{6b}$ and $r_{7b}$ overlap, except for $r_{7a}$. Uniting all overlapping ranges thus results in two temporary disjoint value ranges, $r_{7a}$ and the union of all others. Then these temporary ranges are split up wherever they intersect with a single-value bucket. As $r_{7a}$ includes bucket q3, it is split up into two final value-range buckets, q2 and q4. The same is done for the other temporary range, which is finally split up to form the range buckets q5; q7 and q9.

Figure 4:
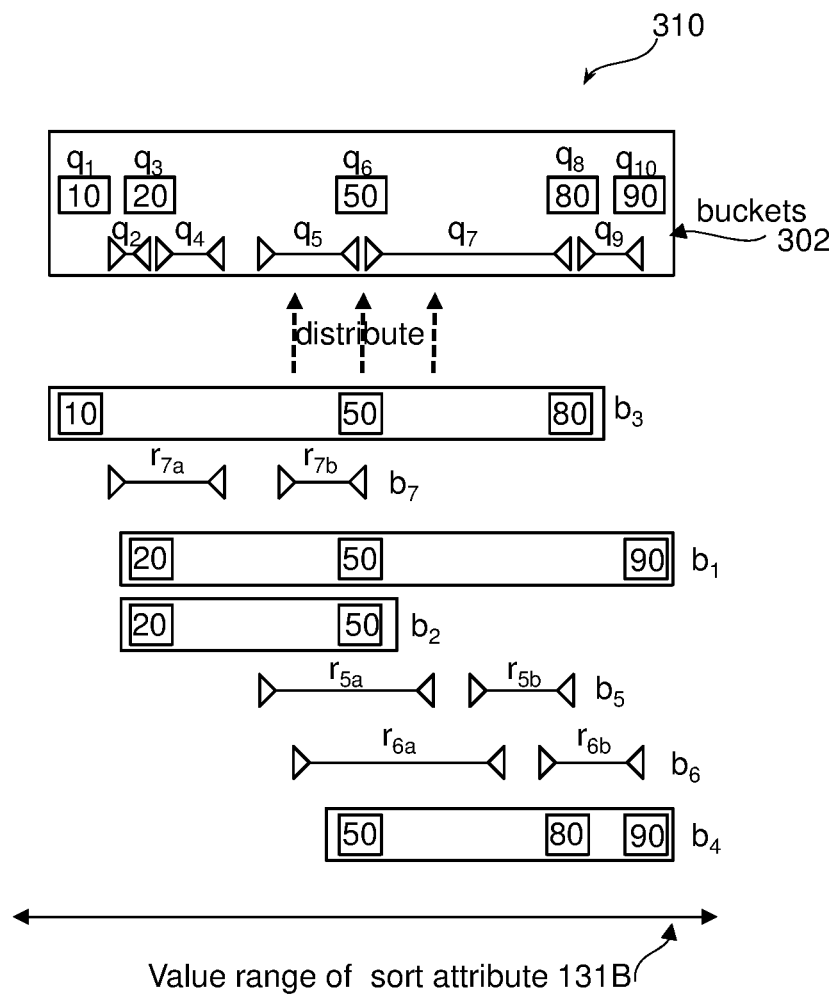
FIG. 4 is a diagram illustrating another example method for sorting the data table.

FIG. 4 is a diagram 310 illustrating an example method for sorting the data table 127 by the attribute 131B. This example of FIG. 4 illustrates an out-of-order processing for the sorting. FIG. 4 illustrates out-of-order processing of the same data blocks as depicted in FIG. 3.

In order to reduce the memory footprint of the sort, the data blocks b1-b7 are processed in the scan list out of order. It is not necessary to wait until all data blocks have been scanned. A bucket can be emptied or processed and its contained data emitted to the final sorted result if 1. all preceding buckets have been emptied and
2. it is known that all data that must be distributed into this bucket has been scanned.

Exploiting the attribute value information the system is able to conclude a-priori which data blocks contain values for a certain bucket. Sorting the scan list by the smallest value that, according to the attribute value information, occurs in every data block and processing the data blocks in this order may guarantee that buckets can be processed to completion and emptied into the final sorted sequence as early as possible. Thus, the buckets may be emptied earlier and thus needs to keep less data in memory at a time.

The scan list as illustrated in FIG. 4 has been sorted by the minimum value of each data block. This way, for example, bucket q1 can be already emptied or processed after data block b3 has been scanned. Likewise, q2 can be emptied or processed after data block b7 and subsequently buckets q3 and q4 can be emptied after data blocks b1 and b2 have been scanned, etc.

Emptying a bucket comprises consuming or using the bucket and deleting the content of the bucket after usage is finished.

In another example, a method is provided where attribute value information on storage data blocks is available. The attribute value information contains information about values within the data block (e.g. min/max values; or list of unique values). The attribute value information may be used to determine appropriate sort buckets for sorting. The attribute value information may be used to determine which data blocks needs to be scanned for which sort bucket. Rows may be distributed to the defined sort buckets. Rows in each sort bucket may be sorted. The buckets may be processed or read in the sort order to produce the sorted sequence. For example, the attribute value information of a data block may contain just min, max values (or boundaries for them) of the attribute 131B. In another example, the attribute value information of a data block may contain a list of unique or distinct values. In another example, the attribute value information of a data block may contain a Bloom filter representing the list of unique values.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digitalversatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer implemented method for sorting a data table by an attribute of the data table, attribute value information being provided for data blocks of the data table, the attribute value information being indicative of distinct values and/or ranges of values of the attribute in each of the data blocks of the data table; the method comprising:
    deriving from the attribute value information distinct ranges and/or distinct values of the attribute of the data table, and for each determined distinct range and/or distinct value creating a bucket;
    for each created bucket determining using the attribute value information which data block of the data table is to be scanned;
    scanning records of the determined data blocks and distributing each scanned record to a corresponding bucket of the buckets created for each of the determined distinct range and/or distinct values;
    sorting by the attribute the entries in each of the buckets having more than one record; and
    providing the buckets in the sort order as the sorted data table;
    wherein the attribute value information further comprising the extremum values, min, max of the attribute in each data block of the data table, the deriving of the distinct values comprising:
    iterating over all 1-bits in the bloom filter, and for every 1-bit position h executing the following steps: determining kmin and kmax as follows:

$$k\mathrm{min} = \frac{\mathrm{min} * a - h}{b} \text{ and } k\mathrm{max} = \frac{\mathrm{max} * a - h}{b},$$

where b is the number of bits in the bloom filter and a is a predefined value; and for every value k in the range [kmin; kmax] compute a candidate distinct value $x_k$ $$x_k = \frac{k * b + h}{a}$$

that can set the bit h.

2. The method of claim 1, wherein each indicated distinct value of the attribute value information being encoded into one or more bits of a bit vector of a bloom filter, wherein the attribute value information of each data block of the data table comprises the bit vector as an indication of the distinct values.

3. The method of claim 1, wherein the sorting of the buckets is performed in parallel.

4. The method of claim 1, wherein the buckets are stored in a first storage, and the processing of a given bucket of the buckets comprising storing records of the given bucket in a second storage and emptying the given bucket.

5. The method of claim 1, wherein the processing further comprises:
    upon scanning the determined data blocks and distributing the records to a given bucket, processing the given bucket.

6. The method of claim 5, wherein before creating the buckets, sorting the data blocks of the data table by an extremum value of the attribute of the data blocks.

7. The method of claim 1, wherein the derived distinct values comprise the distinct values of the attribute value information.

8. The method of claim 1, wherein the distinct ranges comprise non-overlapping ranges of the attribute value information further comprising the minimum and maximum values of the attribute, wherein the attribute is an enumerable type.

9. A system for sorting a data table by an attribute of the data table, attribute value information being provided for data blocks of the data table, the attribute value information being indicative of distinct values and/or ranges of values of the attribute in each of the data blocks of the data table, the system comprising:
   a computer system comprising: a computer processor, a computer-readable storage medium, and program instructions stored on the computer-readable storage medium being executable by the processor, to cause the computer system to perform a method, comprising:
   deriving from the attribute value information distinct ranges and/or distinct values of the attribute of the data table, and for each determined distinct range and/or distinct value creating a bucket;
   for each created bucket determining using the attribute value information which data block of the data table is to be scanned;
   scanning records of the determined data blocks and distributing each scanned record to a corresponding bucket of the buckets created for each of the determined distinct range and/or distinct values;
   sorting by the attribute the entries in each of the buckets having more than one record; and
   providing the buckets in the sort order as the sorted data table;
   wherein the attribute value information further comprising the extremum values, min, max of the attribute in each data block of the data table, the deriving of the distinct values comprising:
   iterating over all 1-bits in the bloom filter, and for every 1-bit position h executing the following steps: determining kmin and kmax as follows:

$$k\min = \frac{\min * a - h}{b} \text{ and } k\max = \frac{\max * a - h}{b},$$

where b is the number of bits in the bloom filter and a is a predefined value; and for every value k in the range [kmin; kmax] compute a candidate distinct value $x_k$ $$x_k = \frac{k * b + h}{a}$$

that can set the bit h.

10. The system of claim 9, wherein each indicated distinct value of the attribute value information being encoded into one or more bits of a bit vector of a bloom filter, wherein the attribute value information of each data block of the data table comprises the bit vector as an indication of the distinct values.

11. The system of claim 9, wherein the sorting of the buckets is performed in parallel.

12. The system of claim 9, wherein the buckets are stored in a first storage, and the processing of a given bucket of the buckets comprising storing records of the given bucket in a second storage and emptying the given bucket.

13. A computer program product for sorting a data table by an attribute of the data table, attribute value information being provided for data blocks of the data table, the attribute value information being indicative of distinct values and/or ranges of values of the attribute in each of the data blocks of the data table, the computer program product comprising a computer readable storage medium having program instructions embodied therewith, wherein the computer readable storage medium is not a transitory signal per se, the program instructions executable by a computer to cause the computer to perform a method, comprising:
   deriving from the attribute value information distinct ranges and/or distinct values of the attribute of the data table, and for each determined distinct range and/or distinct value creating a bucket;
   for each created bucket determining using the attribute value information which data block of the data table is to be scanned;
   scanning records of the determined data blocks and distributing each scanned record to a corresponding bucket of the buckets created for each of the determined distinct range and/or distinct values;
   sorting by the attribute the entries in each of the buckets having more than one record; and
   providing the buckets in the sort order as the sorted data table;
   wherein the attribute value information further comprising the extremum values, min, max of the attribute in each data block of the data table, the deriving of the distinct values comprising:
   iterating over all 1-bits in the bloom filter, and for every 1-bit position h executing the following steps: determining kmin and kmax as follows:

$$k\min = \frac{\min * a - h}{b} \text{ and } k\max = \frac{\max * a - h}{b},$$

where b is the number of bits in the bloom filter and a is a predefined value; and for every value k in the range [kmin; kmax] compute a candidate distinct value $x_k$ $$x_k = \frac{k * b + h}{a}$$

that can set the bit h.

14. The computer program product of claim 13, wherein each indicated distinct value of the attribute value information being encoded into one or more bits of a bit vector of a bloom filter, wherein the attribute value information of each data block of the data table comprises the bit vector as an indication of the distinct values.

15. The computer program product of claim 13, wherein the sorting of the buckets is performed in parallel.

16. The computer program product of claim 13, wherein the buckets are stored in a first storage, and the processing of a given bucket of the buckets comprising storing records of the given bucket in a second storage and emptying the given bucket.

* * * * *